United States Patent [19]

Bourgeois

[11] Patent Number: 4,671,387

[45] Date of Patent: Jun. 9, 1987

[54] DEVICE FOR AUTOMATICALLY CLOSING THE ELEVATOR DECK OF LIFT GATE

[76] Inventor: Jacques Bourgeois, Route de Dampierre, -58310- Saint-Amand-en-Puisaye, France

[21] Appl. No.: 636,991

[22] Filed: Aug. 2, 1984

[51] Int. Cl.⁴ .............................................. B66B 9/20
[52] U.S. Cl. ..................................... 187/9 R; 414/545
[58] Field of Search .............. 187/9 R, 9 E; 414/917, 414/921, 540, 541, 545, 728, 546; 296/50, 56; 92/13.8

[56] References Cited

U.S. PATENT DOCUMENTS

| | | | |
|---|---|---|---|
| 2,656,058 | 10/1953 | Foote | 414/917 |
| 2,716,965 | 9/1955 | Klamp | 92/13.8 |
| 3,233,758 | 2/1966 | Darfus | 414/545 |
| 3,269,567 | 11/1964 | Lugush | 414/546 |
| 3,655,301 | 4/1972 | McClung | 92/13.8 |

FOREIGN PATENT DOCUMENTS

| | | | |
|---|---|---|---|
| 912303 | 4/1946 | France . | |
| 122234 | 7/1983 | Japan | 414/545 |

Primary Examiner—Joseph J. Rolla
Assistant Examiner—Kenneth Noland
Attorney, Agent, or Firm—Sandler & Greenblum

[57] ABSTRACT

A device for automatically closing the elevator deck of lift gate is actuated by a drive device and constituted by a parallelogram deformable under the action of the drive device. The arm of the parallelogram intended to support the elevator deck extends beyond its point of articulation on the lower adjacent arm of the parallelogram, thus defining an extension. The elevator deck is articulated on the lower end of the extension of the arm supporting the elevator desk. An articulation element of adjustable variable length is mounted to pivot, on the one hand, on the elevator deck and, on the other hand, at an appropriate point of the chassis or of the upper arm of the deformable parallelogram, so that the distance between these two points of articulation of the element of articulation of variable length decreases when the lift gate is being raised. When the element of articulation takes its position of minimum length, it acts as a fixed connecting rod causing the elevator deck to pivot at the end of lift of the lift gate from a position determined by the prior adjustment in length of the element of articulation to a new position.

14 Claims, 7 Drawing Figures

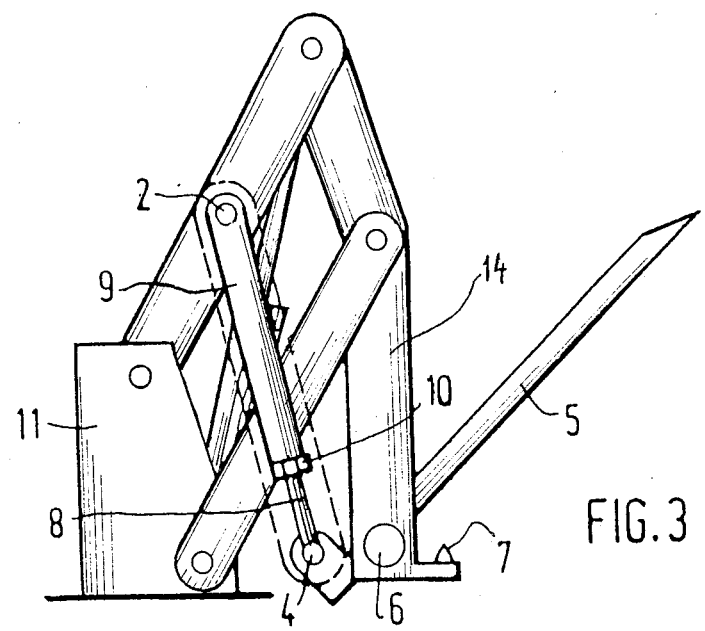
FIG. 3
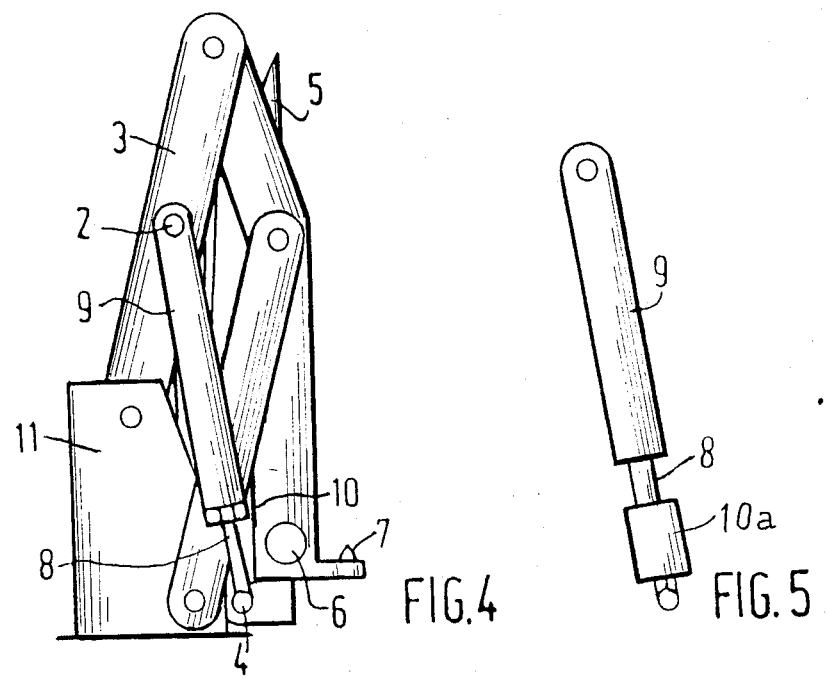
FIG. 4
FIG. 5

4,671,387

DEVICE FOR AUTOMATICALLY CLOSING THE ELEVATOR DECK OF LIFT GATE

BACKGROUND OF THE INVENTION

The present invention relates to lift gates, particularly for automobile vehicles and vehicles intended for handicapped persons. It relates more particularly to a device for automatically closing the elevator deck of such a lift gate, of the type constituted by a parallelogram deformable under the action of drive means, for example mechanical, electrical or hydraulic drive means.

Up to the present time, lift gate decks were generally closed manually or by means of a complex and expensive mechanism. In the prior art, U.S. Pat. No. 3,233,758 for example discloses an elevator device for rear end board of a transport vehicle, this device being constituted, like many other previously known elevator devices, by a deformable parallelogram actuated by a hydraulic jack. French Pat. No. 912303 also discloses an elevator device in which the tipping movement of the deck in horizontal position is limited by extensible connecting rods of which the adjustable minimum length serves to vary the slewability or twisting of the deck, and it will be noted that the elongation of the connecting rod serves only to allow the deck to rise and close, but it does not perform this function automatically.

SUMMARY OF THE INVENTION

It is an object of the present invention to provide a device for automatically raising and closing the deck of a lift gate device of the parallelogram type and comprising at least one connecting rod of variable length with adjustable minimum length, this device overcoming the above-mentioned drawbacks of the elevator devices of the prior art.

A further object of the present invention is to produce a device for automatically closing a lift gate deck, of which the variable length of the connecting rod is obtained by the positioning of its pivot axes at respective points of the chassis and of the device, such that these points approach one another when the lift gate is being raised.

It is a third object of the invention to produce a device for automatically closing a lift gate deck, of which the adjustable connecting rod is articulated, on the one hand, on the elevator deck and, on the other hand, on one of the arms of the parallelogram, or on the frame of the lift gate.

The present invention therefore relates to a device for automatically closing the elevator deck of lift gate, actuated by drive means and constituted by a parallelogram deformable under the action of said drive means, the arm of the parallelogram intended to support the elevator deck extending beyond its point of articulation on the lower adjacent arm of the parrallelogram, thus defining an extension on the free lower end of which the elevator deck is articulated, this device comprising an articulation element of adjustable variable length, mounted to pivot, on the one hand, on the elevator deck and, on the other hand, at an appropriate point of the chassis or of the upper arm of the deformable parallelogram, so that the distance between these two points of articulation of the element of articulation of variable length decreases when the lift gate is being raised, until the element of articulation takes its position of minimum length and thus acts as a fixed connecting rod causing the elevator deck to pivot at the end of lift of the lift gate, from a position determined by the prior adjustment in length of the element of articulation to a new position.

According to a preferred embodiment of the invention, the element of articulation of variable length is adjustable and constituted by a connecting rod of variable length with adjustable minimum length. This connecting rod is constituted by a rod sliding in a tube. Movable means, lockable on the rod, for example a nut, are provided, to come into abutment against the tube, the rod advantageously comprising a threaded section for the displacement of the nut.

In a particular embodiment of the invention, the drive means are advantageously constituted by a singleacting jack of the plunger type, disposed substantially along a diagonal of the parallelogram. Furthermore, according to another particular embodiment of the invention, the lower arm of the parallelogram may be of bent form, in order to allow a greater downward deformation thereof while avoiding abutting against the bodywork of the vehicle.

BRIEF DESCRIPTION OF THE DRAWINGS

The invention will be more readily understood on reading the following description with reference to the accompanying drawings, in which:

FIG. 3 is a side view of the device according to the invention, as it is being raised to close the elevator lift gate.

FIG. 4 is a side view of the device according to the invention, in the completely raised state.

FIG. 5 is a side view of a variant embodiment of the adjustable connecting rod, in which the nut serving as stop has been replaced by a tube having the same function.

DESCRIPTION OF THE PREFERRED EMBODIMENTS

Figure 1:
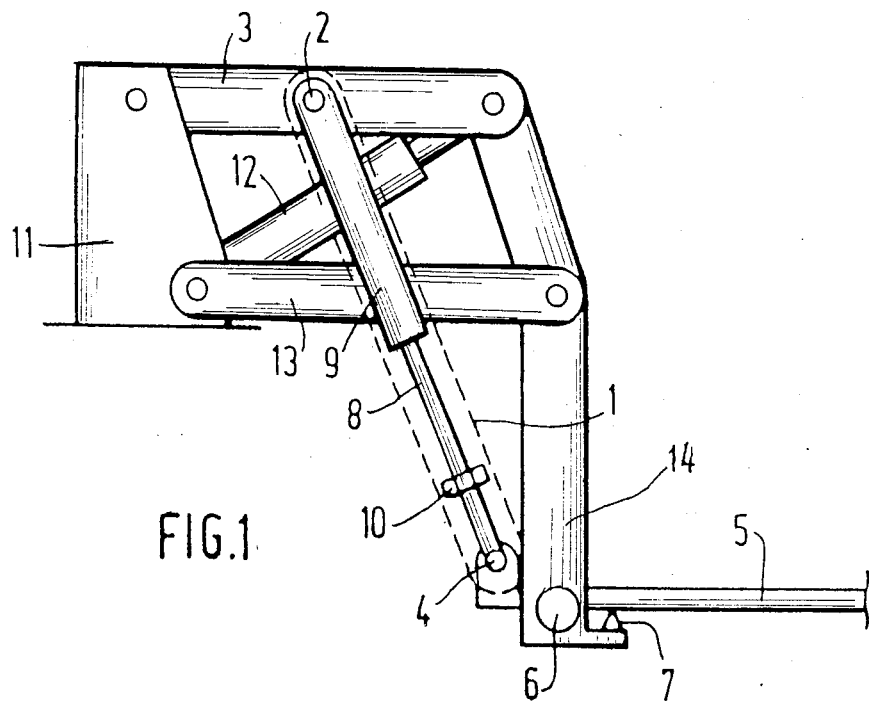
FIG. 1 is a side view of the device according to the invention, with the lift gate in low position.

Referring now to the drawings, in the embodiment shown in FIGS. 1 to 4, the device according to the invention is constituted by a deformable parallelogram mounted to pivot on the frame 11 of the lift gate and constituted by an upper connecting arm 3, a lower connecting arm 13 and an outer bent connecting arm 14. This parallelogram is actuated by a hydraulic, single-acting jack 12 of the plunger type, disposed substantially in the diagonal of the parallelogram and mounted to pivot, on the one hand, on the pivot pin 15 between the upper connecting arm 3 and the connecting arm 14 and, on the other hand, on the pivot pin 15a between the lower connecting arm 13 and the frame 11. A connecting rod 1, of variable length, which is constituted by a rod 8 sliding in a tube 9, is articulated on the one hand, by one of its ends, on a pin 2 connected to the upper arm 3 of the deformable parallelogram and, at its other end, on a pin 4 connected to the frontpart of the lift gate deck 5; this latter abutting on a stop 7 may pivot about its pivot pin 6 at the lower end of the bent connecting arm 14, the stop 7 being provided upon a back extension of the lower part of the bent connecting arm 14. The length of the connecting rod 1 is adjusted by means of a nut 10 screwed on a correspondingly threaded part of the rod 8, and adapted to come into abutment on the tube 9, when the lift gate is completely closed as shown in FIG. 4.

Figure 2:
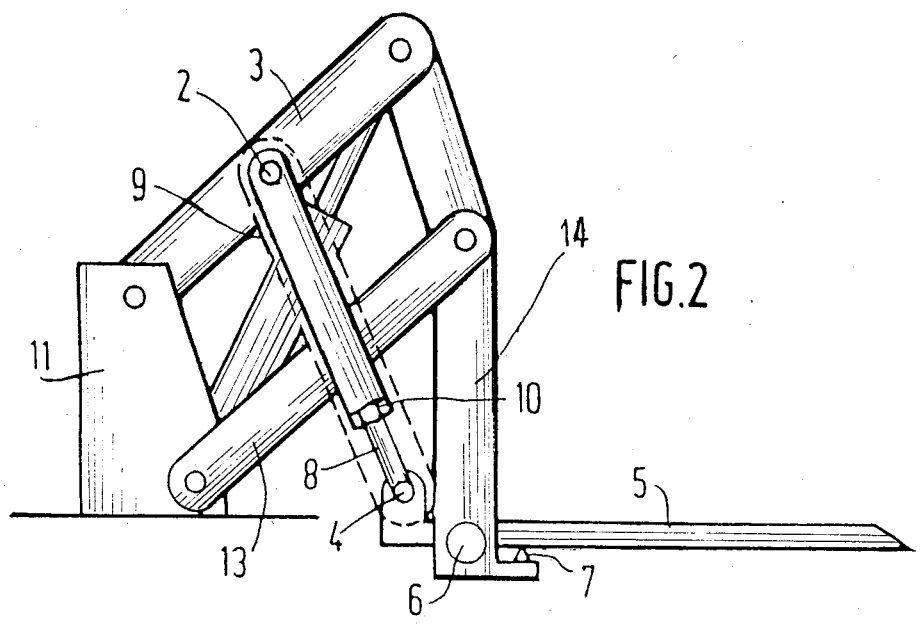
FIG. 2 is a side view of the device according to the invention, with the deck raised up to the level of the vehicle floor.

As shown in FIG. 2, the deck 5 is raised up to the level of the vehicle floor, while the distance separating the two pins 2 and 4 has decreased during the rise of the lift gate, the rod 8 sliding freely in the tube 9 of the connecting rod. It will be noted that, as long as the nut 10 serving as stop does not come into contact with the tube 9 there is no reaction on the pin 4 connected to the deck 5, the latter remaining in abutment on its stop 7.

In FIG. 3, the device is shown as it is being raised to close the elevator lift gate, with the rod 8 in abutment against the tube 9 via the nut 10, which means that the distance separating the two pins 2 and 4 can no longer decrease and consequently the connecting rod 1, which abuts on pin 4 fast with the deck 5, causes the latter to pivot counterclockwise about its pin 6 thus ensuring lift and complete closure thereof, into the completely raised and closed position of the device as shown in FIG. 4.

FIG. 5 shows a variant embodiment of the connecting rod 1 with its tube 9 and rod 8 unchanged, but on the latter the nut 10 is replaced by a movable, adjustable tube 10a also serving as stop for said connecting rod.

Figure 6:
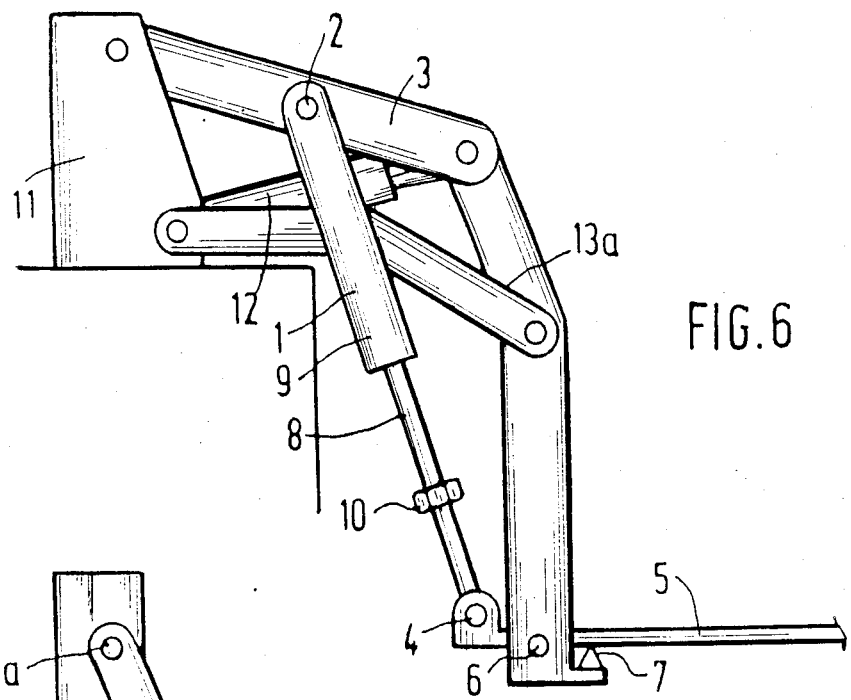
FIG. 6 shows a variant embodiment of the device according to the invention, in which the lower arm of the parallelogram is bent to allow a greater downward stroke.

FIG. 6 shows a variant embodiment of the same type as that of FIGS. 1 to 4, except that the connecting arm 13 has been replaced by a connecting arm 13a which is bent so as to allow a greater downward stroke of the device, as is clearly apparent in this FIG. 6.

Figure 7:
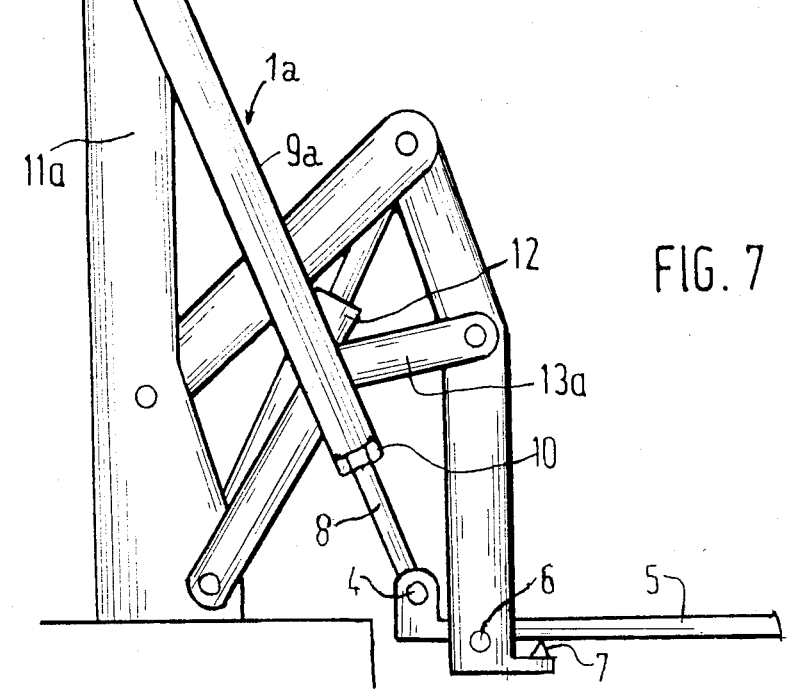
FIG. 7 is a view of a variant of the device of FIG. 6 with the bent lower arm, but of which the connecting rod of variable length is articulated by one end on the frame of the lift gate.

In a second variant embodiment shown in FIG. 7, the variable-length connecting rod 1a comprises a tube 9a, of larger length than tube 9, but of identical configuration, and this rod 1a is articulated at its upper end on a pin 2a connected to the frame 11a of the lift gate, while its lower end, which remains the end of the sliding rod 8, is articulated, as before, on a pin 4 connected to the front part of the deck 5.

The device for automatically closing the deck of the lift gate according to the invention operates as follows:

To raise the lift gate from the position shown for example in FIGS. 1 and 6, the jack 12 is actuated, this displacing the parallelogram upwardly and causing the distance between end pins 2 and 4 of the connecting rod 1 or 1a to decrease. When the connecting rod 1 or 1a has reached its minimum length, as shown for example in FIG. 2 or 7, which is the one obtained when the deck 5 comes substantially to the level of the vehicle floor, the connecting rod 1 or 1a pushes on the pin 4 connected to the deck 5, causing the latter to pivot counterclockwise about its pivot pin 6, to close it automatically (cf. FIGS. 3 and 4). Bent connecting arm 14 is constructed such that as the parallelogram is displaced upwardly, the lower portion, or extension, of bent connecting arm 14 maintains its original orientation. When the lift gate is lowered, the distance between the two pins 2, 4, on which the two ends of the connecting rod 1 or 1a are articulated, increases. At first, the deck 5, pivoting under the effect of a torsion bar, a spring or any other return means (not shown in the drawings), maintains the connecting rod in its shortest position until the deck 5 comes into abutment on its stop 7 connected to the lower end of the bent connecting rod 14. From that moment, the connecting rod 1 extends, while remaining articulated on the two pins of which one, 2 or 2a, is connected to the upper arm 3 of the parallelogram or the frame 11a respectively, and the other, 4, with the deck 5.

The problem of automatically closing the decks of lift gates is thus solved according to the present invention, because of the cooperation between an articulated parallelogram and a connecting rod of variable length, whose minimum length may be pre-adjusted, this connecting rod being articulated at one and on a pin connected to the deck located outside its pivot axis and at the other end on a pin connected to one of the arms of said deformable parallelogram or with the frame of the lift gate itself or with the vehicle on which the lift gate is fixed, at a point such that the pins of the two ends of the variable-length connecting rod approach each other when the lift gate is being raised, whereby, at a position of lift where the deck arrives substantially at the level of the vehicle floor, the connecting rod reaches its predetermined minimum length and, not being able to decrease further, acts, like a fixed connecting rod, during the subsequent constant stroke of the lift gate, on the pin connected to the deck causing it to pivot about its pivot pin, and thus ensuring closure of the lift gate deck.

What I claim is:

1. A device for automatically closing an elevator deck of a lift gate comprising:
    (a) deformable means defining a parallelogram comprising a first arm for supporting said elevator deck, said first arm being articulated at an articulation point on a lower adjacent arm of said deformable means, said first arm comprising an extension having a lower free end for supporting said elevator deck, said extension having an original orientation;
    (b) an adjustable, variable length articulation element having a first end mounted to pivot at a first point on said elevator deck and a second end mounted to pivot at a predetermined point on an upper arm of said deformable means; and wherein the distance between said first point on said elevator deck and said predetermined point on said upper arm decreases as said deformable means is moved in response to drive means for raising said elevator deck, and wherein said articulation element acts as a fixed connecting rod and pushes on said first point causing said elevator deck to automatically pivot about said lower free end of said extension into a closed position in response to said articulation element reaching a predetermined minimum length, and wherein said extension maintains said original orientation throughout the motion of said deformable means.

2. The device according to claim 1 wherein said articulation element comprises a variable length connecting rod having an adjustable minimum length.

3. The device according to claim 2 wherein said variable length connecting rod comprises a rod slidably mounted in a tube.

4. The device according to claim 3 further comprising movable stop means movably mounted on said rod, wherein said movable stop means is lockable on said rod and is adapted to abut said tube.

5. The device according to claim 4 wherein said movable stop means comprises a threaded nut movably mounted on a corresponding threaded section of said rod.

6. The device according to claim 1 wherein said drive means comprises a single-acting plunger jack disposed substantially along a diagonal of said deformable means.

7. The device according to claim 1 wherein said lower adjacent arm is bent downwardly for allowing greater downward deformation of said deformable means.

8. A device for automatically raising and lowering an elevator deck of a lift gate comprising:
   (a) a frame for supporting said lift gate;
   (b) an upper arm having an upper arm first end pivotably connected to said frame and a upper arm second end;
   (c) a lower arm having a lower arm first end pivotably connected to said frame and a lower arm second end;
   (d) a side arm having a sidearm first end pivotably connected to said upper arm second end, and a side arm second end pivotably connected to said lower arm second end, wherein said frame, said upper arm, said lower arm and said side arm are in the shape of a deformable parallelogram;
   (e) an extension arm extending from said side arm beyond said lower arm, said extension arm having an original orientation and a lower free end for pivotably supporting said elevator deck about a pivot pin;
   (f) an adjustable, variable length articulation element having a first end pivotably connected to a middle portion of said upper arm and a second end pivotably connected to said elevator deck;
   (g) means for automatically raising and lowering said elevator deck operable to change the length of said adjustable, variable length articulation element, wherein said elevator deck pivots about said pivot pin and said second end of said articulation element when said articulation element reaches a predetermined length and wherein when said means for automatically raising and lowering said elevator deck is operated, said extension arm maintains said original orientation.

9. The device according to claim 8 wherein said adjustable, variable length articulation element comprises a variable length connecting rod having an adjustable minimum length.

10. The device according to claim 9, wherein said predetermined length is substantially equal to said adjustable minimum length.

11. The device according to claim 8 wherein:
    (a) said upper arm is substantially straight between said upper arm first end and said upper arm second end; and
    (b) said lower arm is substantially straight between said lower arm first end and said lower arm second end.

12. The device according to claim 8 wherein:
    (a) said upper arm is substantially straight between said upper arm first end and said upper arm second end; and
    (b) said lower arm is bent downwardly between said lower arm first end and said lower arm second end.

13. The device according to claim 8 wherein said means for raising and lowering said elevator deck comprises drive means for raising and lowering said elevator deck, said drive means extending diagonally between said upper arm second end and said lower arm first end.

14. The device according to claim 13 wherein said drive means comprises a single-acting plunger jack.

* * * * *